United States Patent [19]

Ohashi et al.

[11] Patent Number: 4,742,468

[45] Date of Patent: May 3, 1988

[54] LIFT TRUCK CONTROL SYSTEM

[75] Inventors: Akira Ohashi, Isehara; Yoshiaki Nishimura, Zama; Akio Kurakata, Machida, all of Japan

[73] Assignee: Yamate Industrial Co., Ltd., Sagamihara, Japan

[21] Appl. No.: 875,053

[22] Filed: Jun. 16, 1986

[51] Int. Cl.[4] .......................... G06F 15/20; B66F 9/06

[52] U.S. Cl. .................................... 364/424; 364/478; 414/273; 414/910

[58] Field of Search ........................ 364/424, 478, 558; 340/673, 686; 414/273-275, 621-627, 745, 910

[56] References Cited

U.S. PATENT DOCUMENTS

| | | | |
|---|---|---|---|
| 3,970,205 | 7/1976 | Delpuppo | 414/910 |
| 4,491,918 | 1/1985 | Yuki et al. | 414/273 |
| 4,509,127 | 4/1985 | Yuki et al. | 414/274 |
| 4,517,645 | 5/1985 | Yuki et al. | 364/424 |
| 4,520,443 | 5/1985 | Yuki et al. | 364/424 |
| 4,604,724 | 8/1986 | Shaginian et al. | 364/478 |

*Primary Examiner*—Gary Chin
*Attorney, Agent, or Firm*—Cushman, Darby & Cushman

[57] ABSTRACT

A system for controlling a lift truck apparatus with a clamp, the angle of which is set by a rotator, is disclosed. The rotator is provided with an angle sensor for detecting its rotational angle position, and the clamp is provided with a clamp pressure sensor for detecting the clamp pressure. A plurality of selection switches operable in an auto mode are provided on an operation panel for rotator control and clamp control. These selection switches designate memory areas of angle memory means and pressure memory means. By selectively operating the selection switches, corresponding angle data and pressure data are read out from the angle and pressure memory means. A clamp operation of the clamp is executed according to pressure data read out according to operation of an operation lever. Also according to the operation of the operation lever angle data is read out to control the rotator so as to control the angle of the clamp.

9 Claims, 20 Drawing Sheets

LIFT TRUCK CONTROL SYSTEM

BACKGROUND OF THE INVENTION

This invention relates to a lift truck control system and, more particularly, to improvements in a lift truck control system for causing a lift operation of clamping a cylindrical heavy object, e.g., a paper roll in a warehouse, for instance, rotating in this state, transporting the object in either longitudinal or transversal direction and unloading the object.

The lift truck of the type noted uses various attachments. Basically, attachments comprise a clamp and a rotator for rotating the clamp. Where a cylindrical heavy object such as a paper roll is handled for transport, a roll clamp is used. The clamp clamps the cylindrical object and, in this state, is set by the rotator to an angle position suited for the transport of the clamped object. In this way, loading and unloading operations are performed. Where such operation is performed with a fork lift, the clamp angle is controlled to permit clamping of the object, and also the angular position of the clamp is set such that the object can be readily clamped. A clamp operation is executed by bringing the clamp to a position to clamp the object. In this case, the clamp pressure is controlled such that the object is reliably clamped and raised. If the clamp pressure is too low, the object can not be stably supported. If the pressure is excessive, on the other hand, the object is liable to be damaged. Therefore, it is necessary to set an optimum clamp pressure depending on the weight and mechanical strength of the object.

In other words, to perform an operation of moving large, heavy and cylindrical objects to stack them in a warehouse using a fork lift, very high degrees of skill and decision are required. In addition, even if the operation is performed very carefully, the operation is greatly dangerous, and there are problems in connection with the improvement of the operation efficiency.

SUMMARY OF THE INVENTION

An object of the invention is to provide a lift truck control system, which permits even an operator having a low level of skill to safely and reliably handle large and heavy objects having an instable shape for loading and unloading operations in a warehouse.

Another object of the invention is to provide a lift truck control system which can handle paper rolls or similar large, heavy, and cylindrical objects which are liable to be deformed by an application of a high clamp pressure, in performing a safe and reliable stacking of the paper rolls in a warehouse without causing damage.

A further object of the invention is to provide a lift truck control system which can safely and reliably repeat an operation of such a type, thereby improving the operation efficiency.

The lift truck control system according to the present invention comprises a clamp pressure sensor means and a rotator angle sensor means for a lift truck in which a clamp is rotatably supported on a rotator. Further, a pressure and an angle memory means are provided, in which a plurality of clamp pressure data and a plurality of rotator angle data can be stored. The stored pressure and angle data are selectively read out. The pressure data and angle data both read from the memory means are compared with the pressure and angle detected by the sensor means. In accordance with the results of this comparison, the clamp pressure and rotor angle are adjusted by feedback control.

In this lift truck control system, a plurality of clamp pressure data and a plurality of rotator angle data are stored in respective memory areas of the respective pressure and angle memory means, and one pressure data and one angle data ones which are necessary for operation are read out from among the stored data. In this state, a rotator control command and a clamp control command are generated by operating an operation lever. The rotator is controlled by the difference between the data detected by the angle sensor and the data stored in the memory means. Hence, the angle of rotation of the clamp is automatically adjusted to the value read from the memory means. Further, the clamp is automatically controlled to clamp the object with the pressure equal to the value stored in the memory means. Thus, even an operator having a low level of skill can safely and reliably handle objects without need of a particular skill. Thus, an operation which otherwise requires skill can be easily performed, so that operation efficiency can be effectively improved.

DETAILED DESCRIPTION OF THE PREFERRED EMBODIMENT

Figure 1:
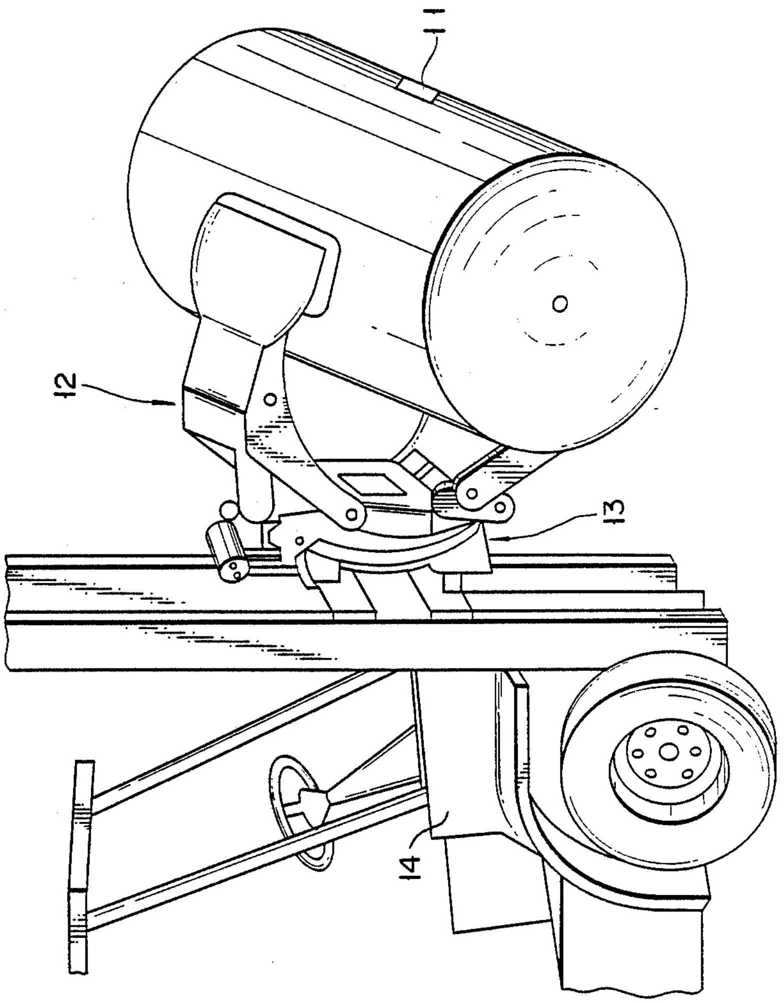
FIG. 1 is a perspective view showing a fork lift apparatus controlled by an embodiment of the fork lift control system according to the present invention.

FIG. 1 shows a lift truck apparatus, which is provided with clamp 12 for clamping paper roll 11 or similar object so as to be transported. Clamp 12 is mounted on body 14 by rotator 13. Rotator 13 rotates clamp 12 angularly to a position suited to clamp object 11 and also to a position suited for transporting object 11.

Figure 2:
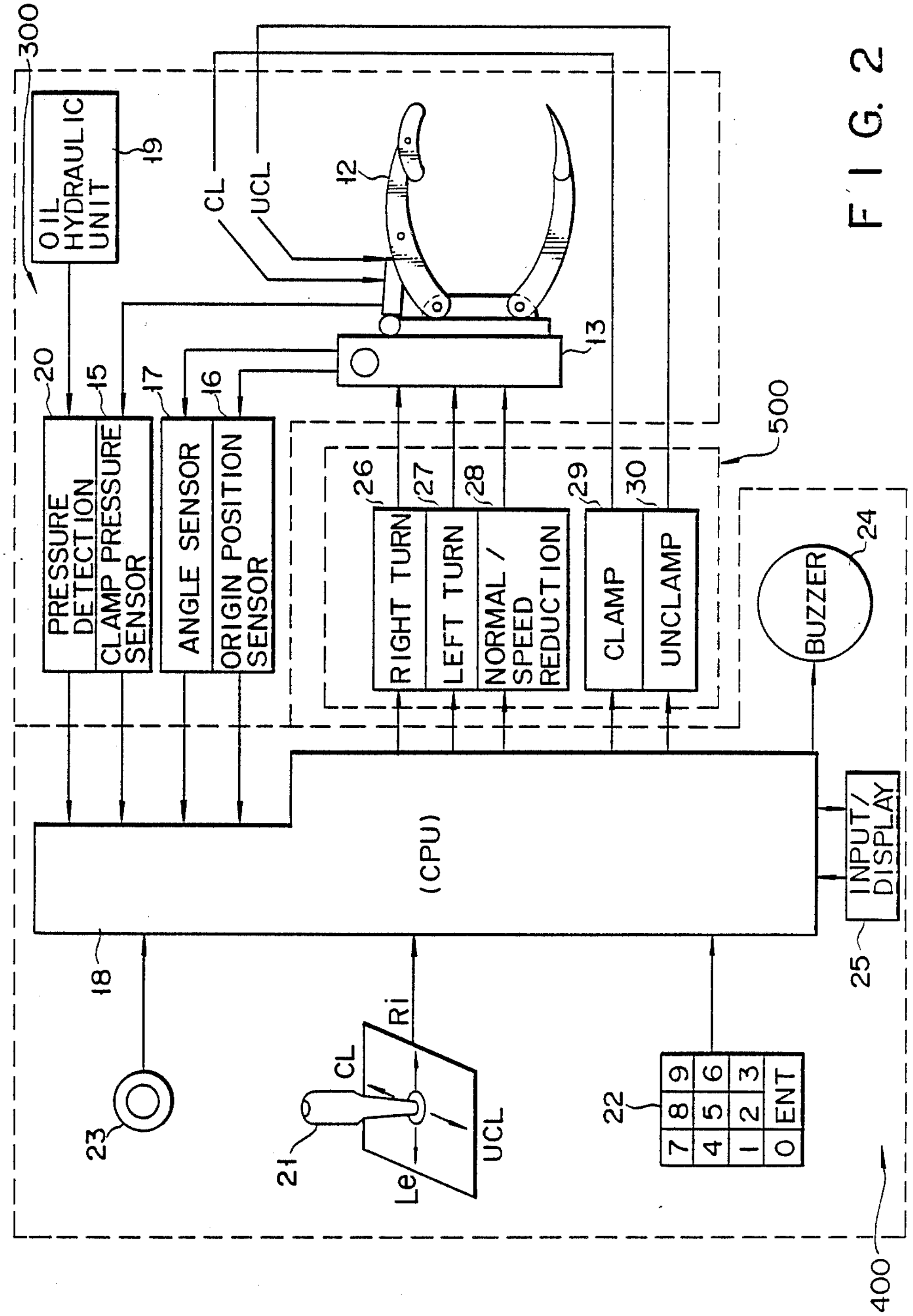
FIG. 2 is a schematic representation of the fork lift control system.

FIG. 2 shows a control system for such a lift truck apparatus. Oil hydraulic system 300 is provided for driving clamp 12. Oil hydraulic system 300 includes clamp pressure sensor 15 which detects the clamp pressure with which object 11, e.g., a paper roll, is clamped by clamp 12. Oil hydraulic system 300 also includes reference position sensor 16 and rotator angle sensor 17 for rotator 13. Reference position sensor 16 generates a signal whose level remains high as long as rotator 13 is set at the reference position. Rotator angle sensor 17 provides angle data corresponding to the angular position of rotator 13. Data from sensors 15 to 17 are fed to operational processor 18 consisting of a microcomputer with a CPU. Further, since this type of apparatus is hydraulically driven, oil hydraulic pressure sensor 20 is provided for detecting the oil hydraulic pressure of oil hydraulic unit 19. A detection signal from oil hydraulic pressure sensor 20 is also fed to operational processor 18 to determine if normal operation control can be made at all times.

Operational processor 18 is accessed on operation panel 400. The operation panel has operating lever 21 for generating clamp command CL, right turn command Ri, left turn command Le and unclamp command UC. Operation lever 21 can be manipulated in a direction corresponding to a desired command, whereupon a corresponding command signal is generated. The command signal corresponding to the operation of lever 21 is fed to operational processor 18.

Operation panel 400 also has numeral key set 22 for coupling input data, stop push button 23 for generating an emergency stop command, an alarm buzzer 24, and a mode data display 25 for displaying input.

Operational processor 18 includes a memory in which clamp pressure data, rotator angle data, etc. supplied from numeral key set 22, etc. are stored. Clamp 12 and rotator 13 are controlled according to commands provided by operating lever 21. Operational processor 18 gives commands to right and left turn controllers 26 and 27 and to speed controller 28 all provided in electromagnetic valve mechanism 500. Controllers 26 to 28 control oil hydraulic pressure controlling rotational angle of rotator 13. For clamp 12, operational processor 18 feeds a clamp or unclamp command to controller 29 and 30, and it is thus executed accordingly.

Figure 3:
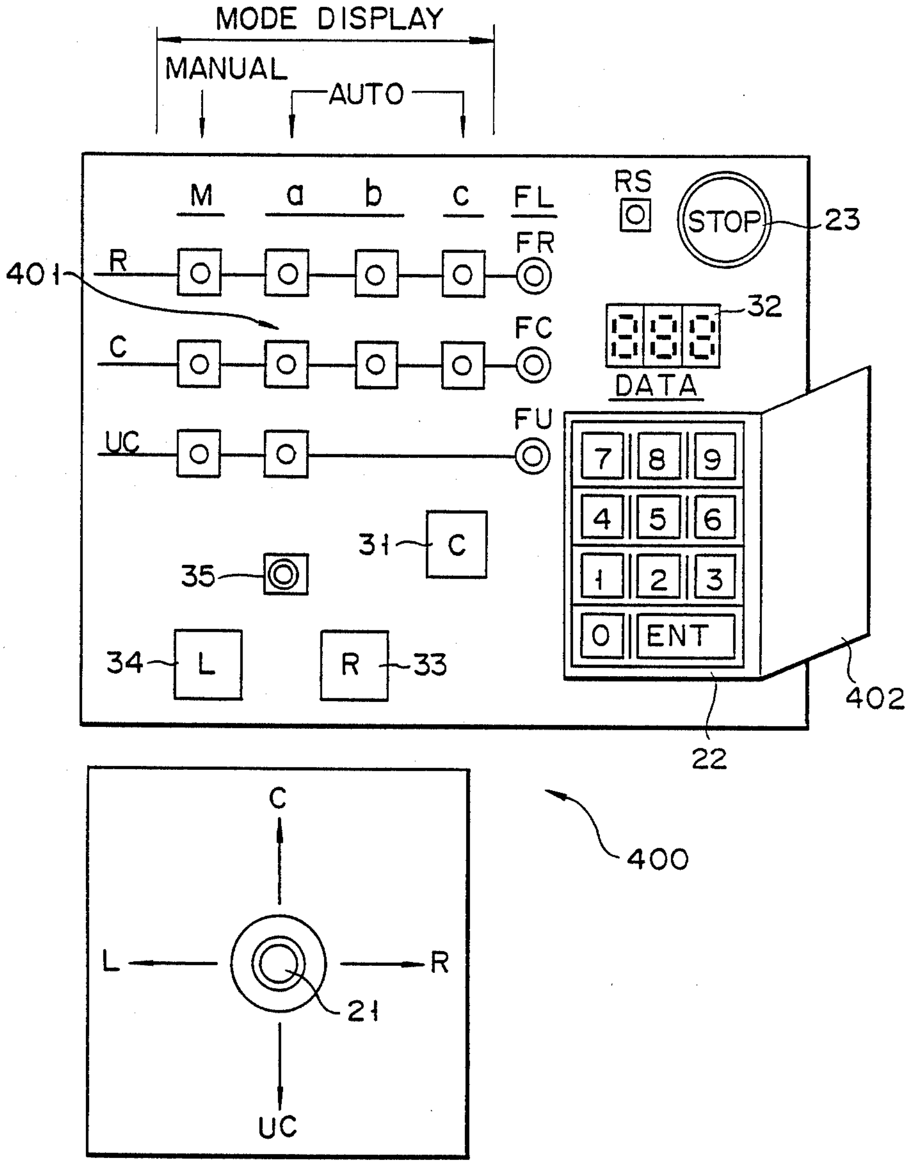
FIG. 3 is a view showing an operation panel of the control system.

FIG. 3 shows a specific example of operation panel 400. Operation panel 400 has a plurality of command push buttons 401 for setting a plurality of different modes corresponding to rotator command R, clamp command C and unclamp command UC. The command push buttons for commands R and C include manual command push button M and auto command push buttons a to c. To input data, the operator pushes the button for rotator command R or the button for clamp command C to designate the address at which the data should be stored. When operating the clamp apparatus, a similar operation is done for the read address designation. For command UC, two command push buttons, i.e., manual and auto command push buttons, are provided, and one of these push buttons is selectively operated. In a state where an auto mode is designated, data representing the open angle range of clamp 12 is coupled, and stored data is read out. Operation panel 400 further includes operation completion displays FR, FC and FU for respective commands R, C and UC.

Further, cover 402 which can be opened and closed with respect to numeral key set 22 is provided. A data input mode is set when cover 402 is opened, and a data selection mode is set when the cover is closed. For example, by operating one of the auto command push buttons for the clamp command and operating numeral key set 22 with cover 402 in the open state, input data is written in a memory address corresponding to the operated push button. By operating a command push button with cover 402 in the closed state, data stored in the address corresponding to the operated push button is read out. Operation panel 400 further has additional clamp command push button 31, data display 32, right and left rotator unit fine adjustment command push buttons 33 and 34 and origin clear command push button 35. Parts shown in FIG. 2 are designated by like reference numerals in FIG. 3.

Figure 4A:
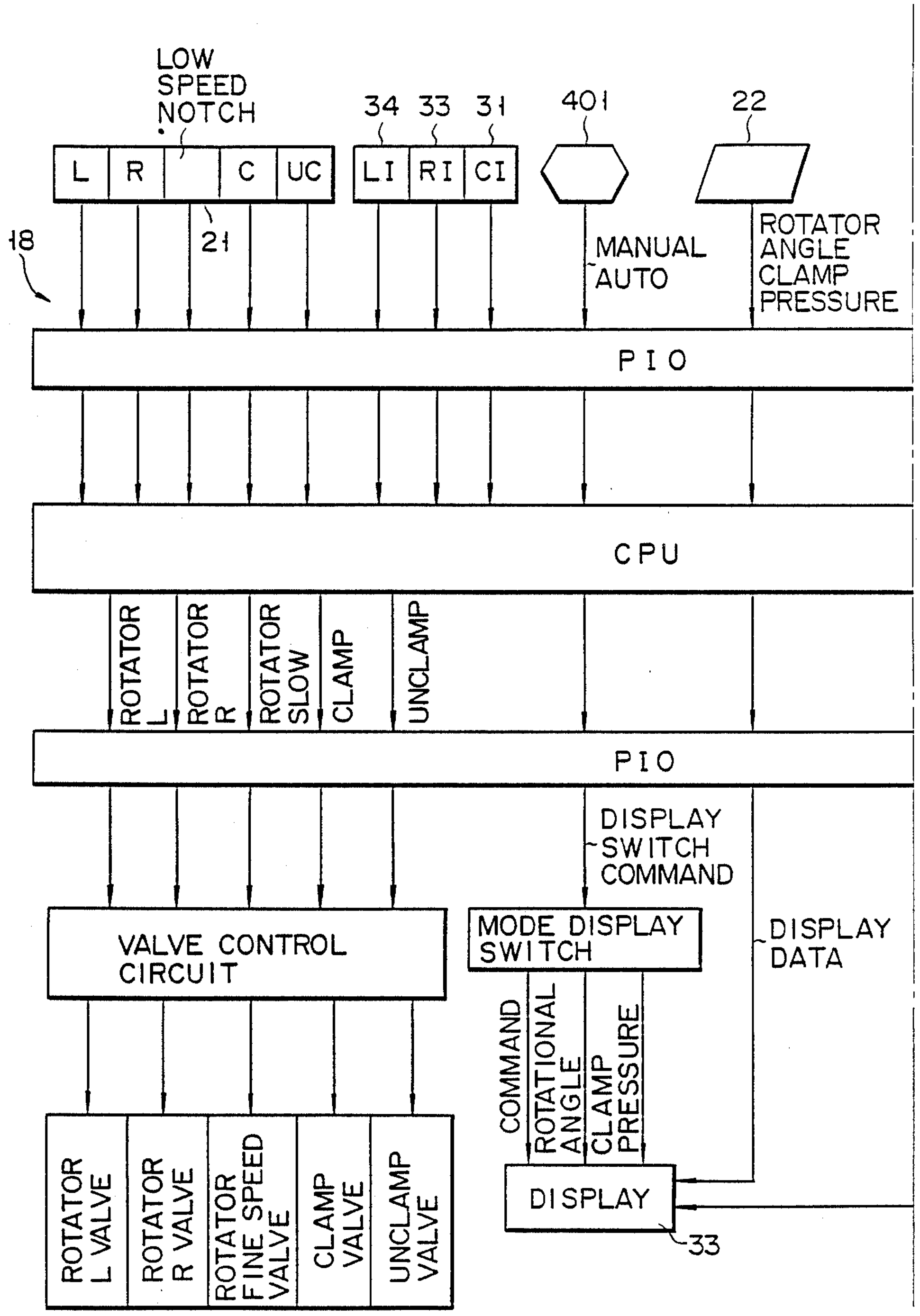
FIGS. 4A and 4B are a view for explaining a processor of the control system.
Figure 4B:
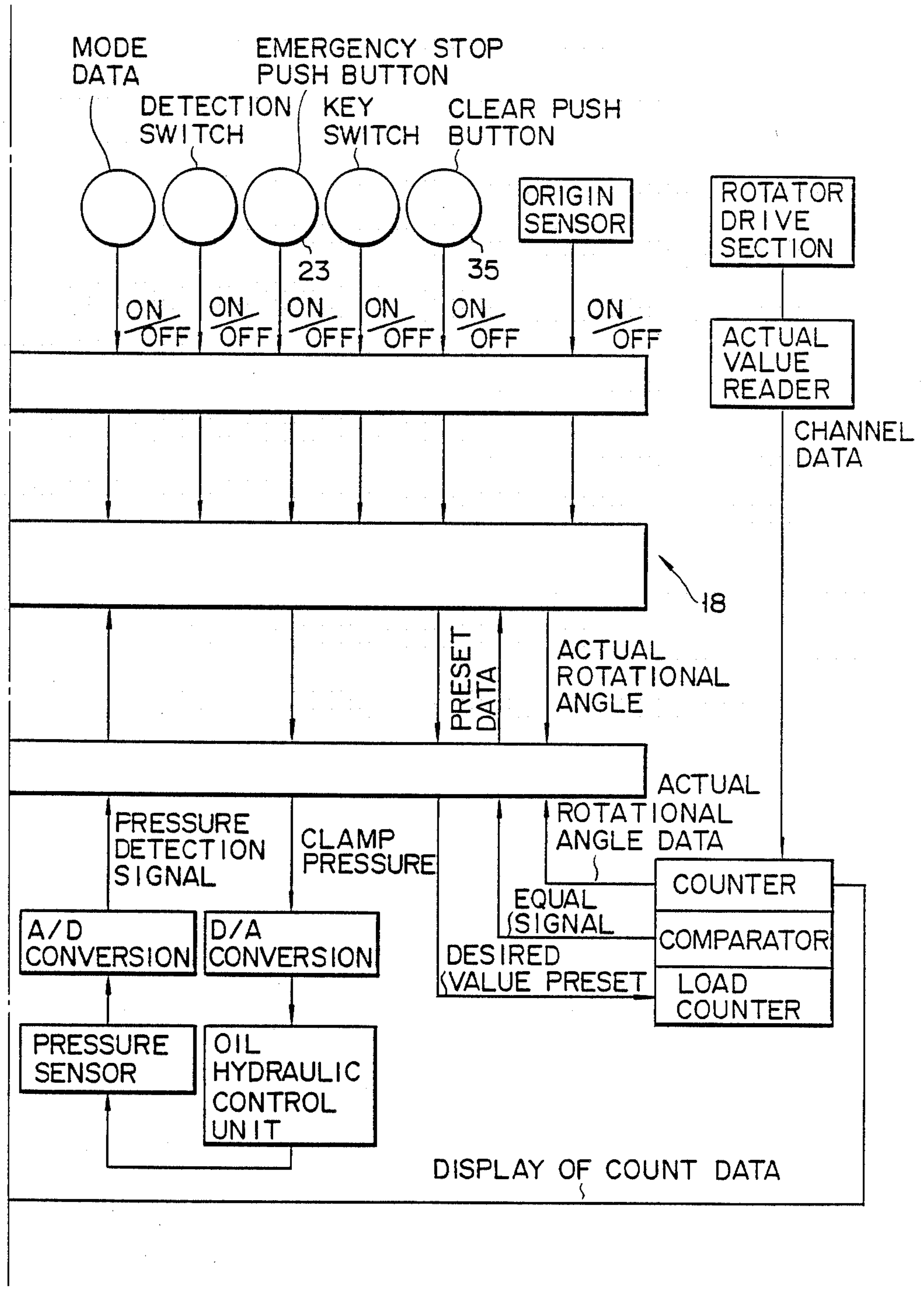

FIG. 4 shows the constitution of operational processor 18, to which commands are coupled from operation panel 400 described above. According to the input commands, operational processor 18 produces control data to control oil hydraulic system and the valve system, thus controlling the rotator unit and clamp unit. Further, it fetches data representing the rotator angle and clamp pressure using a counter or the like, and it controls the rotator angle and clamp pressure using these data.

Figure 5:
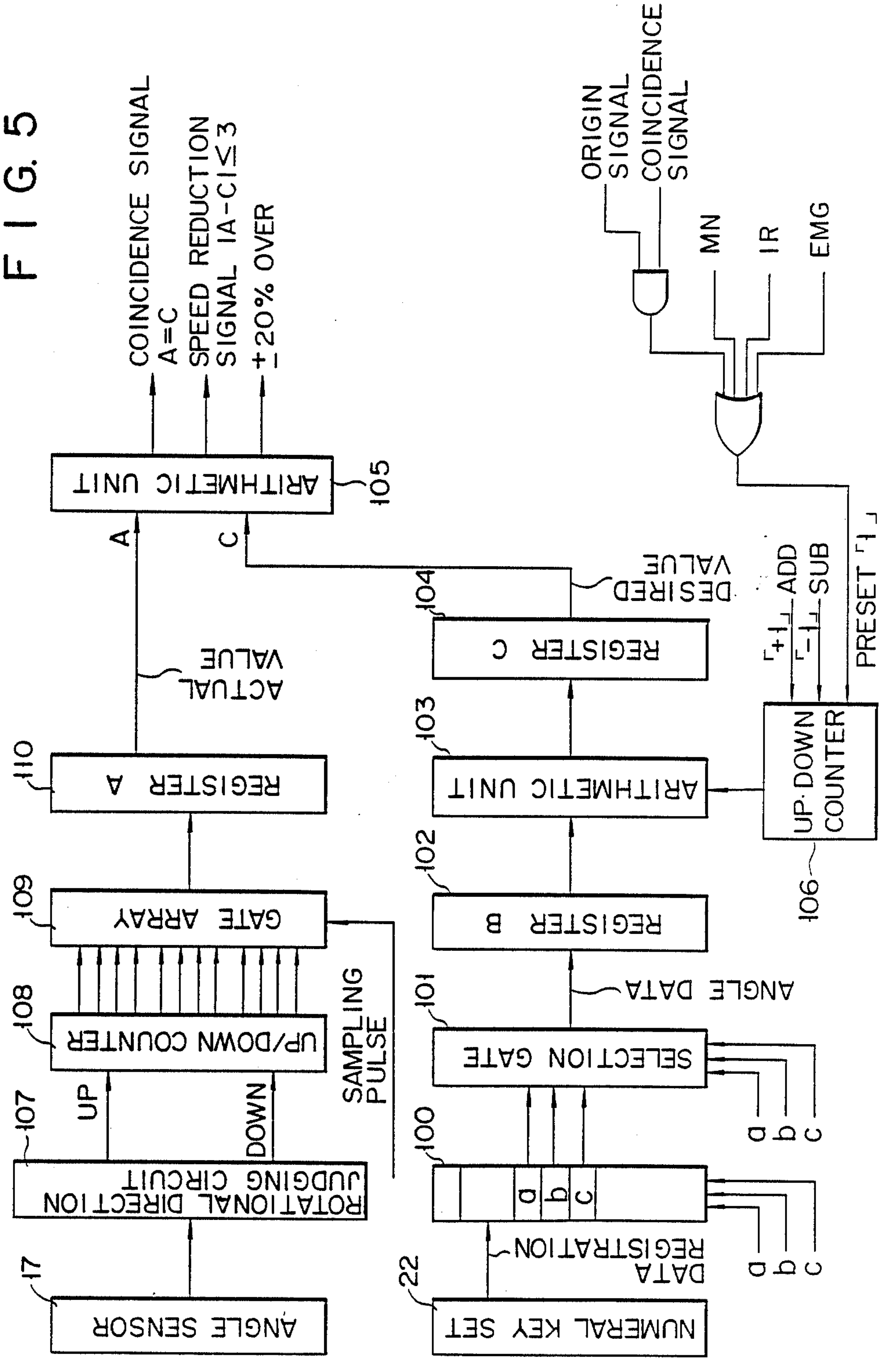
FIG. 5 is a view showing a rotator angle control logic for executing control.

FIG. 5 shows the rotator angle control logic. When numeral key set 22 is operated in the data input mode, data is registered in memory (storage device) 100. Memory 100 has memory areas a to c, and data are registered in these memory areas by operation of the mode designation command push button R noted above. Selection gate 101 selectively provides data registered in one of memory areas a to c in corresponding to the operated one of push buttons a to c as rotator angle data. The rotator angle data selected by selection gate 101 is stored in register B 102. The angle data stored in register B 102 is multiplied in arithmetic unit 103, and the result of multiplification is stored in register C 104. The stored data is fed as desired rotator angle data C to arithmetic unit 105.

To arithmetic unit 103 is fed a multiplication number from up/down counter 106. In counter 106 "1" is preset in case when an origin signal from rotator 13 prevails while the actual value and desired value coincide, in case when a manual operation mode MN is set, in case of initial reset state IR, and in case of an emergency stop state EMG, and data stored in register B 102 is provided as the desired value. When add command ADD is provided in a rotate command logic to be described later, counter 106 is incremented by "+1". When a subtract command SUB is provided, counter 106 is incremented by "−1". In this way, desired rotational angle data is calculated, which is necessary for reaching an angular position corresponding to the angle data from the prevailing angular position.

Angle sensor 17 which is provided in rotator 13 generates a pulse signal every time the rotator is rotated by a specified angle. This signal is fed either as up or down count signal in correspondence to the rotational direction discriminated by rotational direction discriminator 107 to counter 108 for up or down counting control. The count of counter 108 corresponds to the angular position of rotator 13. The count is read out by gate array 109 in correspondence to a sampling pulse to be stored as rotator angle data in register A 110. The prevailing angle data of rotator 13 is fed as data A to arithmetic unit 105.

Arithmetic unit 105 compares actual value data A and desired value data C fed to it and provides a coincidence signal when A=C, a speed reduction signal when C is is close to A, for instance within 3 and an excess signal representing an overshoot state within 20%.

Figures 6, 7:
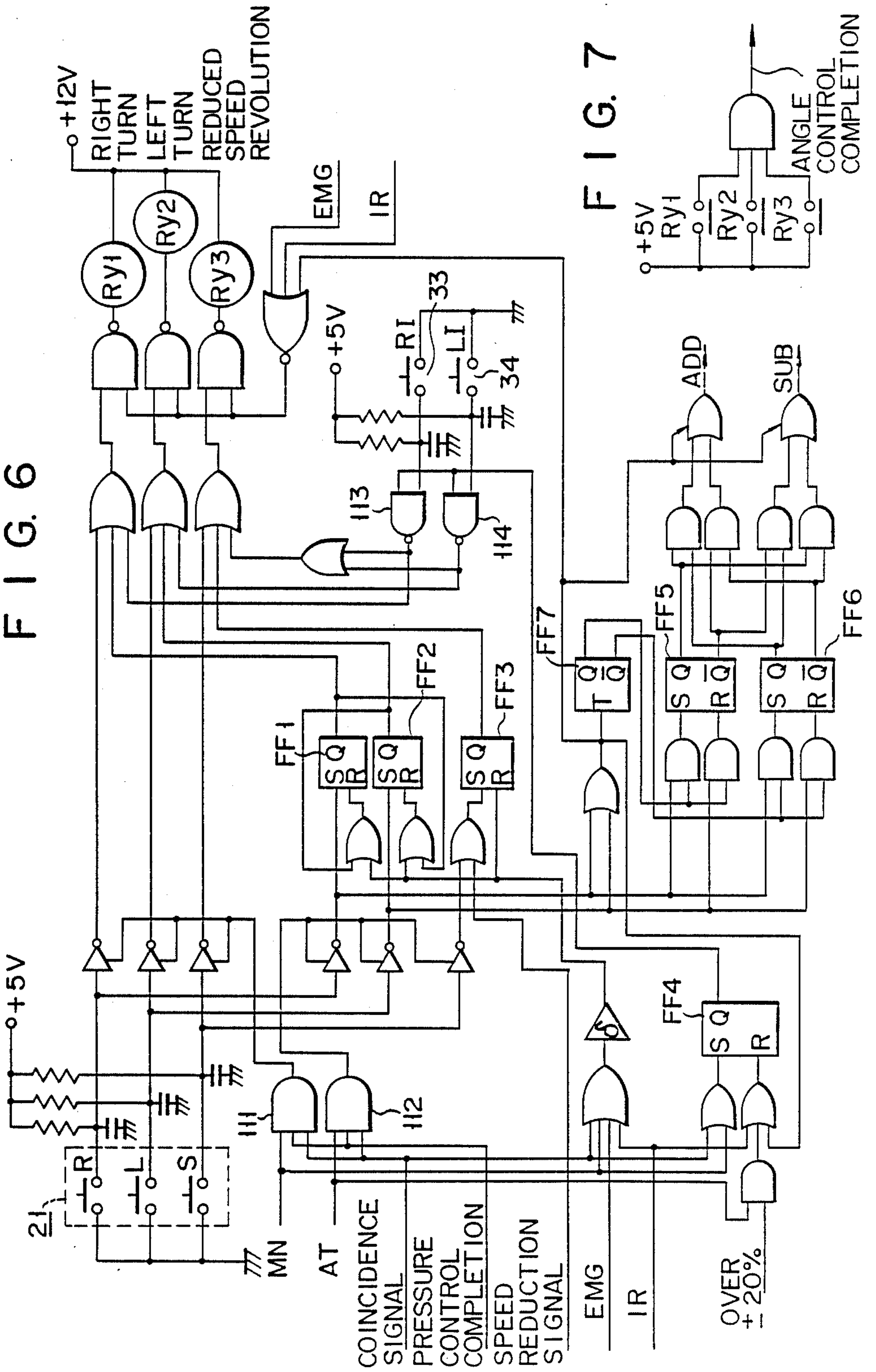
FIG. 6 is a view showing a rotate command logic.
FIG. 7 is a view showing angle control completion generator.

FIG. 6 shows the rotate command logic. It includes AND gates 111 and 112 which provide output signals corresponding to manual setting signal MN and auto setting signal AT, respectively, in the presence of a rotate coincidence signal (from arithmetic unit 105) and a pressure control completion signal. In the presence of the output signal from AND gate 111, signals from switches R, L and S which are closed with operation of operation lever 21 cause operation command signals to be fed to relays $R_{y1}$ to $R_{y3}$ which provide to rotator 13 right, left and reduced speed rotate commands, respectively.

In the presence of the output of AND gate 112 representing an auto state, signals from switches R, L and S are fed as set commands to flip-flops FFl to FF3. Of flip-flops FF1 and FF2 corresponding to respective switches R and L, one is set while the other is reset. Flip-flops FFl to FF3 are reset in the instance of emergency stop command EMG, and their set output signals are fed to respective relays $R_{y1}$ to $R_{y3}$. More specifically, when operation lever 21 is operated in the auto state after a previous operation control has been completed, one of switches R, L and S is closed depending on the operation state, thus selectively rendering the corresponding one of relays $R_{y1}$ to $R_{y3}$ operative, and rotor 13 is controlled according to the provided operation command. This operation state is continued unless emergency EMG occurs or initial reset command IR is provided.

When the operation state as noted above sets in, the coincidence signal noted above vanishes. When the desired rotational angle position is reached by rotator 13, however, a coincidence signal is generated again. This coincidence signal sets flip-flop FF4. Flip-flop FF4 is also reset by signal MN and also by signal IR, 20% over signal and signal AT. The set output signal of flip-flop FF4 is fed along with output signals from fine adjustment push buttons 33 and 34 to respective NOR gates 113 and 114. The output signals of NOR gates 113 and 114 render inoperative relays $R_{y1}$ to $R_{y3}$ having been operative. Rotator 13 is when it reaches the desired rotational angle position.

In the auto state, one of flip-flops FF1 to FF3 is set with the operation of operation lever 21, whereby a rotation command state is set. Operation lever 21 may be operated while a rotation start command is generated. Flip-flop FF3 is for causing a speed reduction control, and it can also be set by a speed reduction command from arithmetic unit 105.

A signal generated from switch R or L with operation of operation lever 21 sets or resets flip-flops FF5 and FF6. Whether these flip-flops are set or reset is determined by flip-flop FF7, the output of which is inverted every time a signal is generated from switch R or L. Signal ADD or signal SUB is generated depending on the state of flip-flops FF5 and FF6. For example, when operation layer 21 is turned to the right R and is operated continuously in the direction of R, signal ADD is generated to increment counter 106 shown in FIG. 5 by "+1" to set a desired value in the increasing angle direction. More specifically, if data stored in register B 102 represents an angle of 30 degrees, rotator 13 is turned by 30 degrees by a first command R. When a command R is generated once again in this state, signal ADD is generated to cause a calculation of 30 degrees by 2 in arithmetic unit 103. The desired value thus is increased to 60 degrees, so that rotor 13 is further rotated by 30 degrees to a 60-degree position. In the converse case where switch L is operated continuously, a signal SUB is generated to increment counter 106 by "−1".

When the rotator control is completed, all of relays $R_{y1}$ to $R_{y3}$ are rendered inoperative. When this state is brought about, an angle control completion signal is generated by a circuit as shown in FIG. 7.

Figure 8:
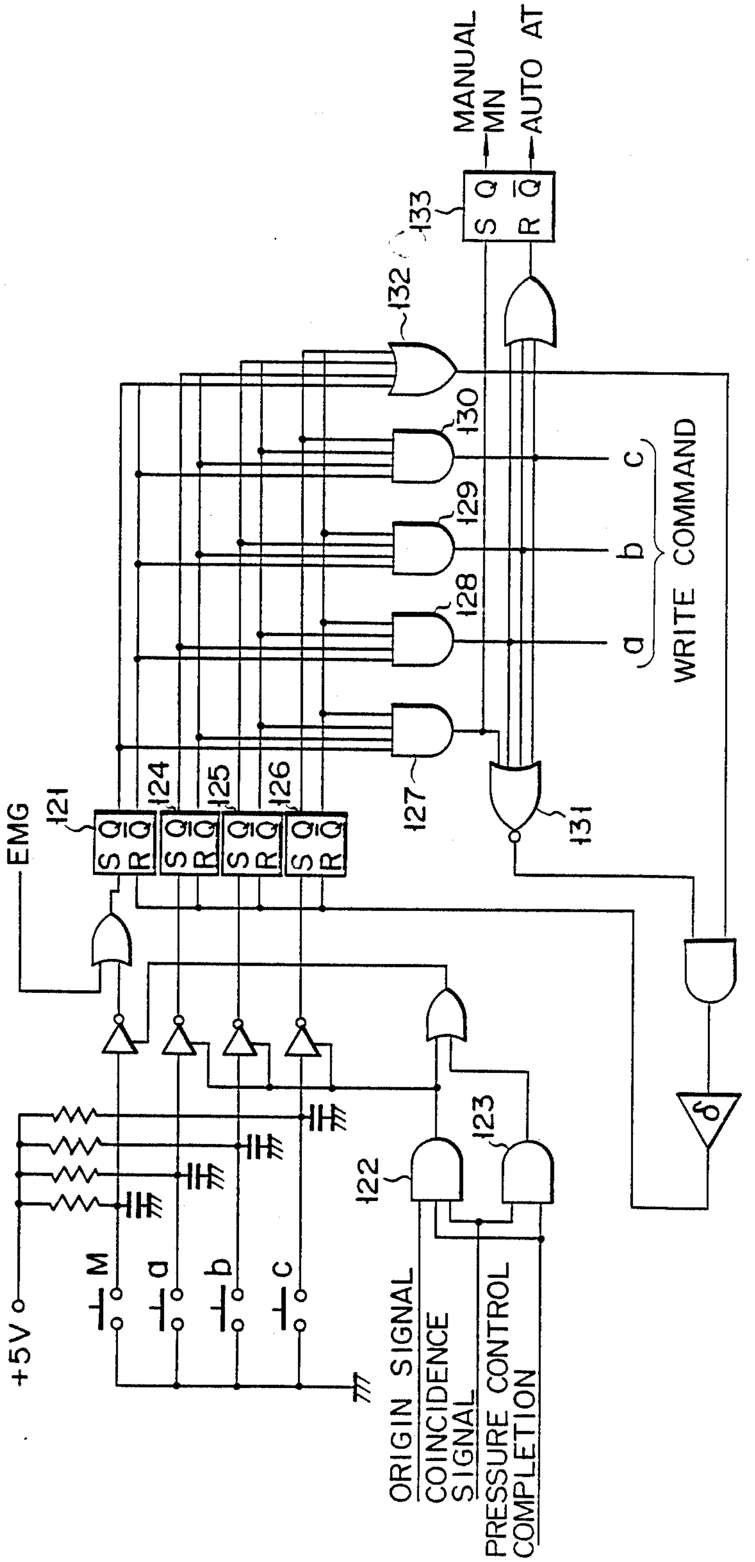
FIG. 8 is a view showing a rotate mode setting logic.

FIG. 8 shows a rotate mode setting logic for setting a rotor angle in the auto state. The logic includes switches M and a to c which are closed by respective manual and three auto command push buttons M and a to c for R. Flip-flop 121 is set by the closure of switch M and emergency command EMG. The output of switch M is taken out by an output of AND gate 122 which is provided when there holds an AND of an origin signal and a coincidence signal. That is, the signal of switch M is made effective when AND gate 122 provides the output.

Signals from switches a to c are taken out when there is at least either an output of AND gate 122 or an output of AND gate 123, which provides output when there holds an AND of a coincidence signal and a pressure control completion signal. The signals from switches a to c set flip-flops 124 to 126. A condition that only one of flip-flops 121 and 124 to 126 is set, is detected by AND gates 127 to 130 and NOR gate 131. Also, a condition that at least one of the flip-flops is set is detected by OR gate 132. Flip-flops 121 and 124 to 126 are reset when there are output signals form NOR gate 131 and OR gate 132.

When flip-flop 121 only is set by switch M, flip-flop 133 is set by the output of AND gate 127, whereby a setting signal MN is generated. When one of flip-flops 124 to 126 corresponding to switches a to c is set, a corresponding one of AND gates 128 to 130 provides output. The output signals from AND gates 128 to 130 serve as command for writing data in memory 100 (FIG. 5) and designate addresses a to c in which to write data. In this mode of writing data in memory 100, numeral key set 22 is operated, and input data is written the specified address. The stored data is used as rotator angle setting data. OR gate 134 monitors the generation of output from AND gates 128 to 130. The output signal of OR gate 134 resets flip-flop 133, whereupon an auto state designation signal is provided.

Figure 9:
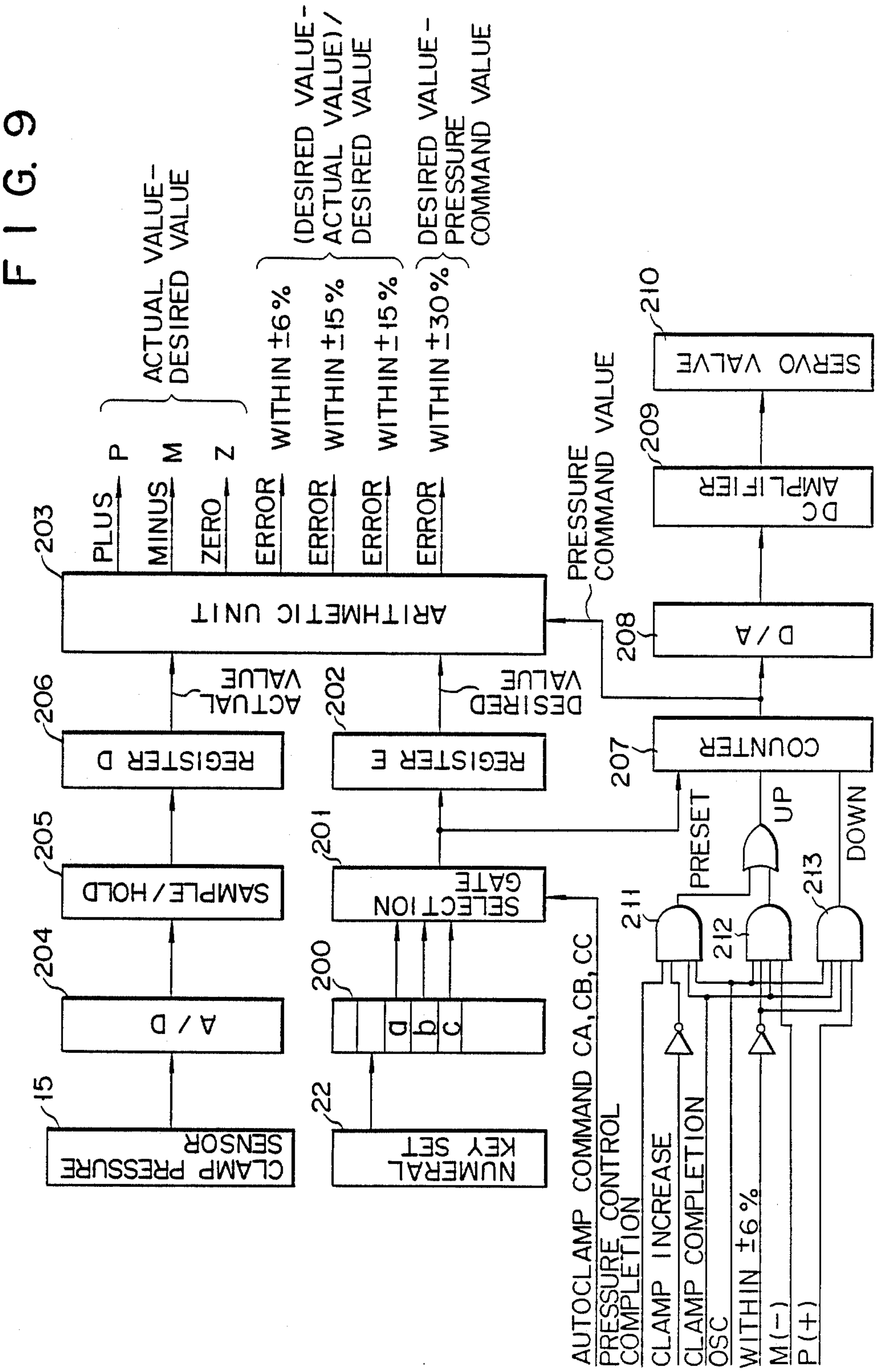
FIG. 9 is a view showing a clamp pressure control logic.

FIG. 9 shows a clamp pressure control logic. Data coupled from numeral key set 22 is written in memory 200. Memory 200 has memory areas corresponding to push buttons a to c in the auto state. Independent data are stored in the respective memory areas. Data stored in memory 200 is selectively read out in correspondence to command signals CA to CC from push buttons for selecting a to c through selection gate 201, which is controlled according an auto clamp command and signals CA to CC. The read-out data is stored in register E 202. Data stored in register 202 is fed as a desired clamp pressure value to arithmetic unit 203.

A detection signal from clamp pressure sensor 15 provided in clamp 12 is converted in A/D converter 204 into digital data which is stored in sample/hold circuit 205. Clamp pressure data stored in register D 206 is fed as actual value data to arithmetic unit 203. Arithmetic unit 203 compares the actual value with the desired value and generates a signal representing the difference between the compared values and a command signal representing whether the pressure should be raised or lowered.

Data read out from selection gate 201 is fed as a preset command to up/down counter 207. The count data of counter 207 is converted by D/A converter 208 into an analog signal and then amplified by DC amplifier 209 before being fed to servo valve 210. Servo valve 210 serves as a clamp pressure control valve. The count data of counter 207 is also fed as pressure command value to arithmetic unit 203.

When an output is provided from at least either AND gate 211, which detects a pressure control completion state and a state of absence of any clamp pressure increase command, and AND gate 212, which detects the difference between the actual and desired values is more than 6% in the negative direction, an up-counting command is given to counter 207 to that counter 207 up-counts a clock signal from oscillator OSC. AND gate 213 detects a difference in excess of 6% in the positive direction and provides a down-counting command to counter 207 for down-counting the signal from oscillator OSC.

Figure 10:
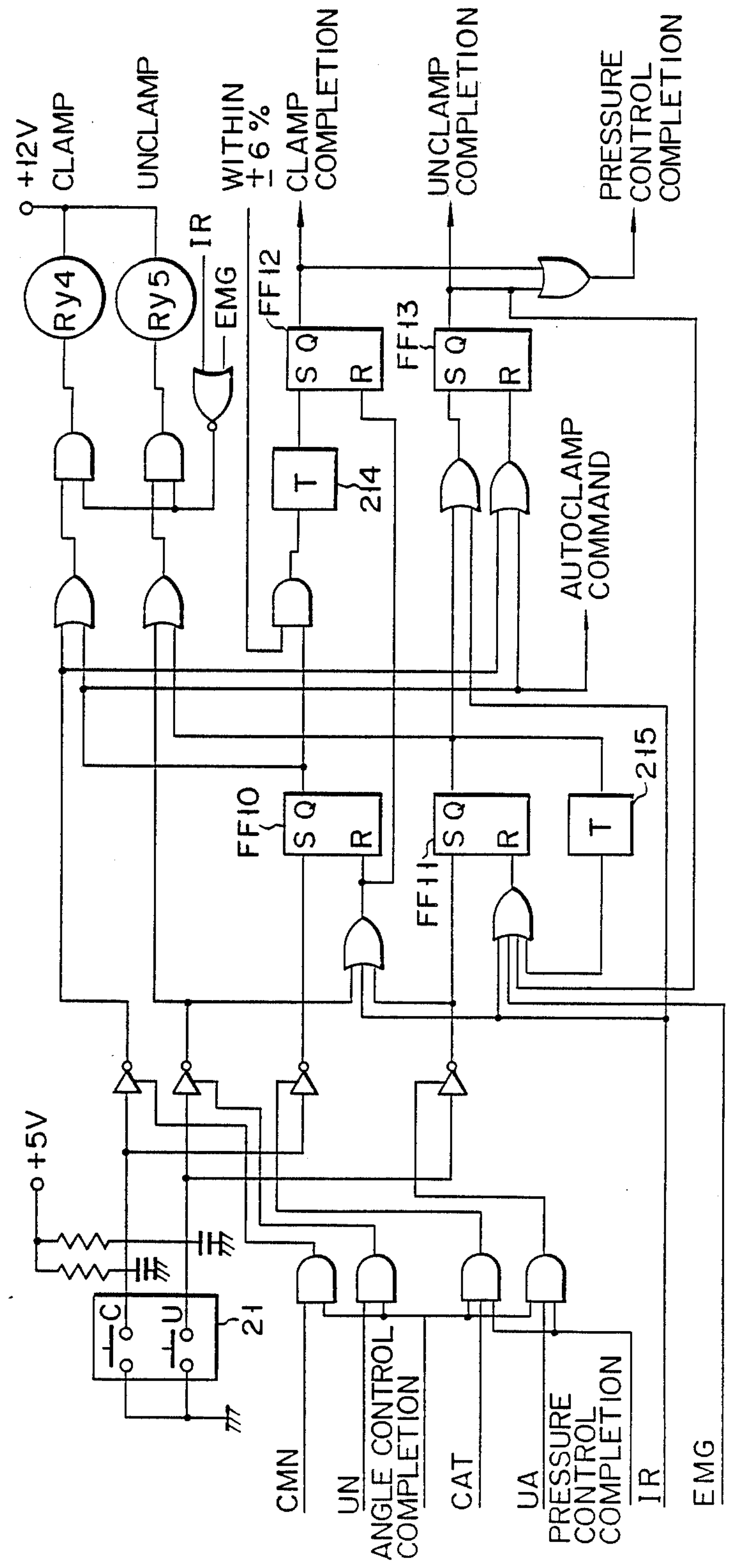
FIG. 10 is a view showing a clamp/unclamp command logic.

FIG. 10 shows a clamp/unclamp command logic. A signal from the switch which is closed with operation of operation lever 21 for clamp command C is detected in an angle control completion state and clamp manual state CMN and drives relay $R_{y4}$ for clamp command in the absence of an initial reset state IR or an emergency EMG. Further, in the angle control completion state and in the presence of clamp auto CAT, an operation signal from switch C sets flip-flop FF10.

An operation signal with operation of operation lever 21 for unclamp command UC is detected in the angle control completion state and in the presence of unclamp auto UA, and drives relay $R_{y5}$ for unclamp under the condition of absence of IR and EMG. The signal from switch U is detected in unclamp auto state UA and pressure control completion state. In this detection state, flip-flop FF11 is set. In their set state, flip-flops FF10 and FF11 provide operation commands to relays $R_{y4}$ and $R_{y5}$ for clamp and unclamp operations, respectively.

The set output signal of flip-flop FF10 is detected under a condition that the actual value is within 6% of the desired value. Upon detection of the output signal, timer 214 is started. After time preset by timer 214 has been measured, flip-flop FF12 is set to provide an unclamp completion signal.

The set output signal of flip-flop FF11 is fed as set command along with signal IR to flip-flop FF13. The set output signal of flip-flop FF13 is provided as a clamp completion signal. The set output signal of flip-flop 11 is fed through a timer 215 to the reset terminal of flip-flop FF11. An unclamp operation is executed in a time range set in the timer 215.

Figure 11:
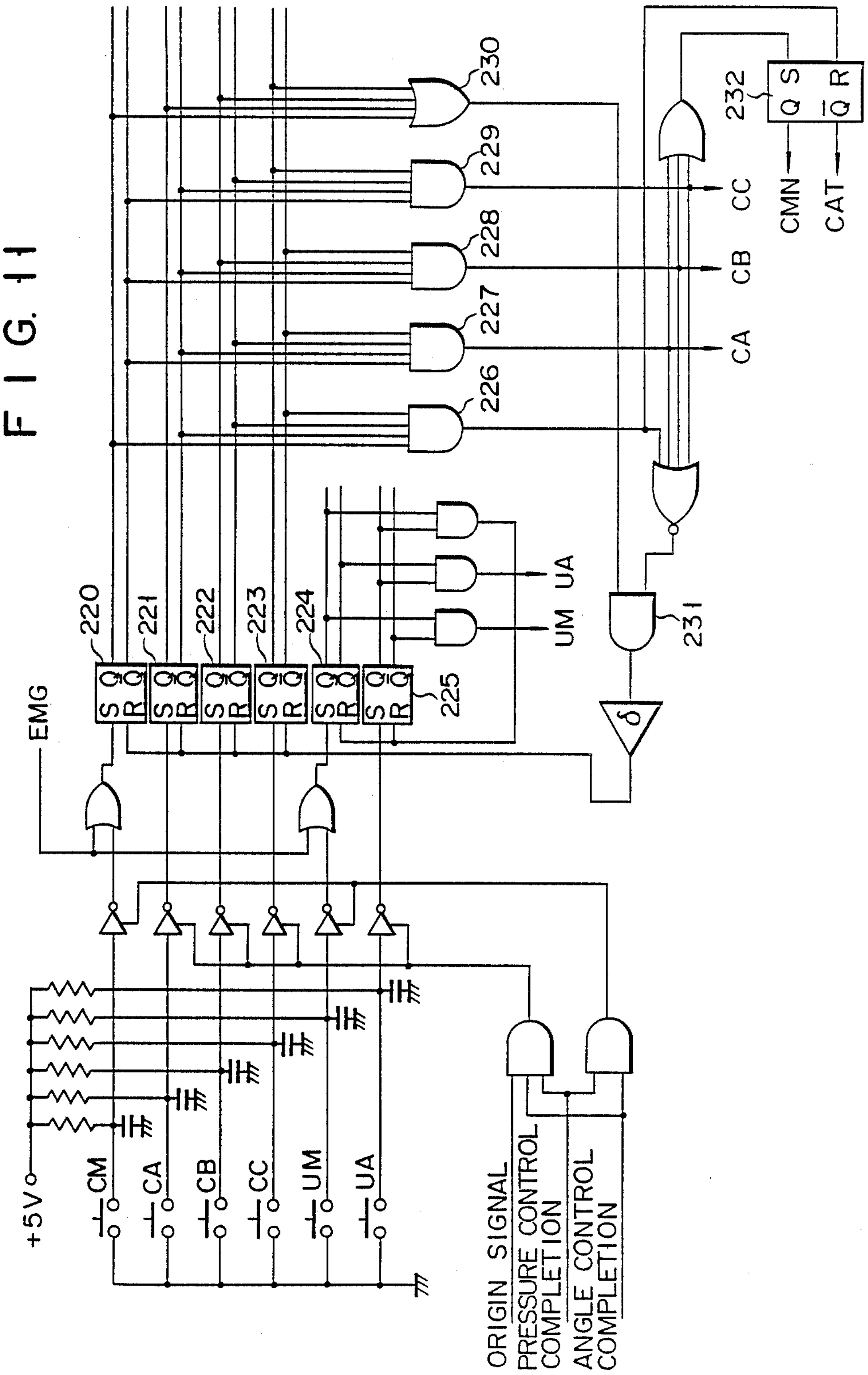
FIG. 11 is a view showing a clamp/unclamp mode setting logic.
Figure 12:
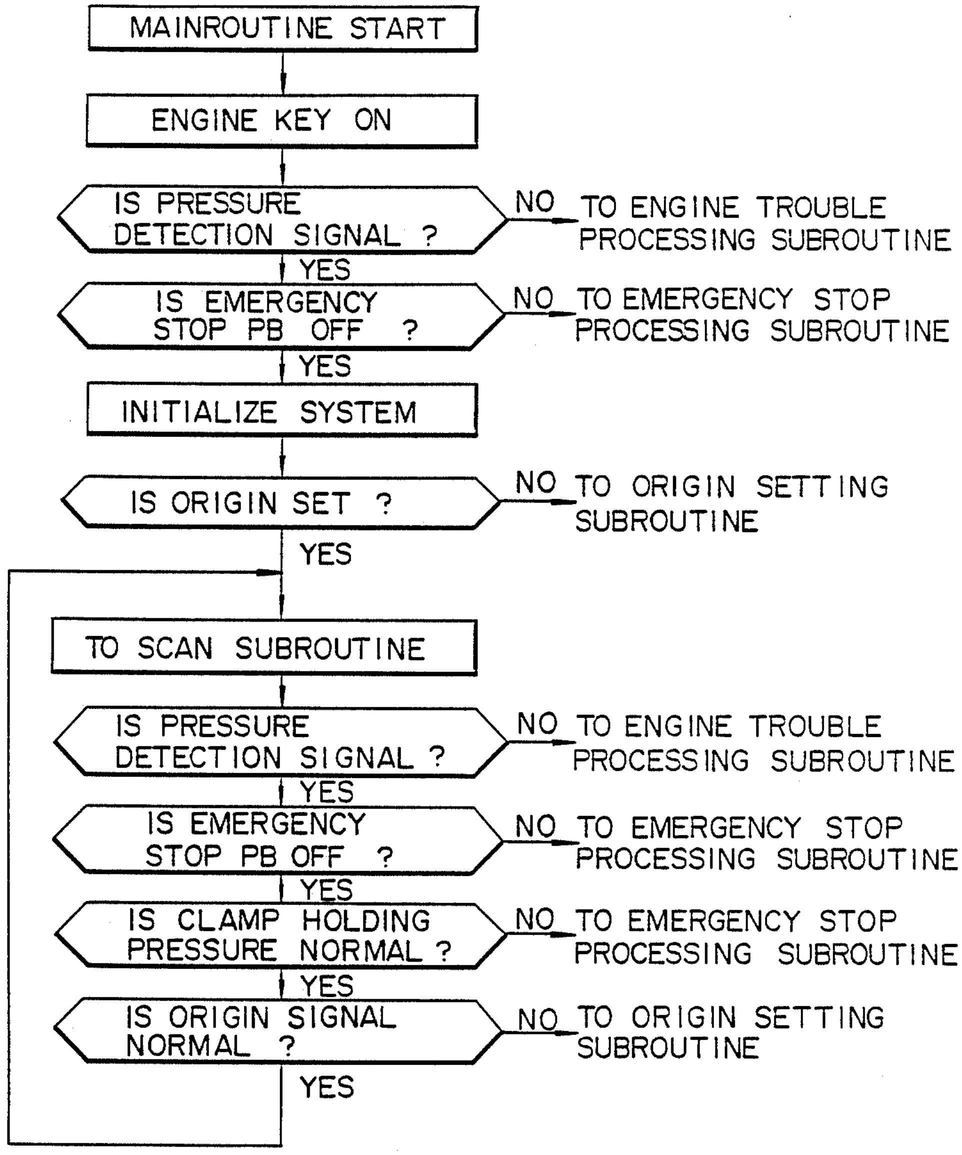
FIGS. 12 to 21 are flow charts illustrating main routine and subroutines of the fork lift control.
Figure 13:
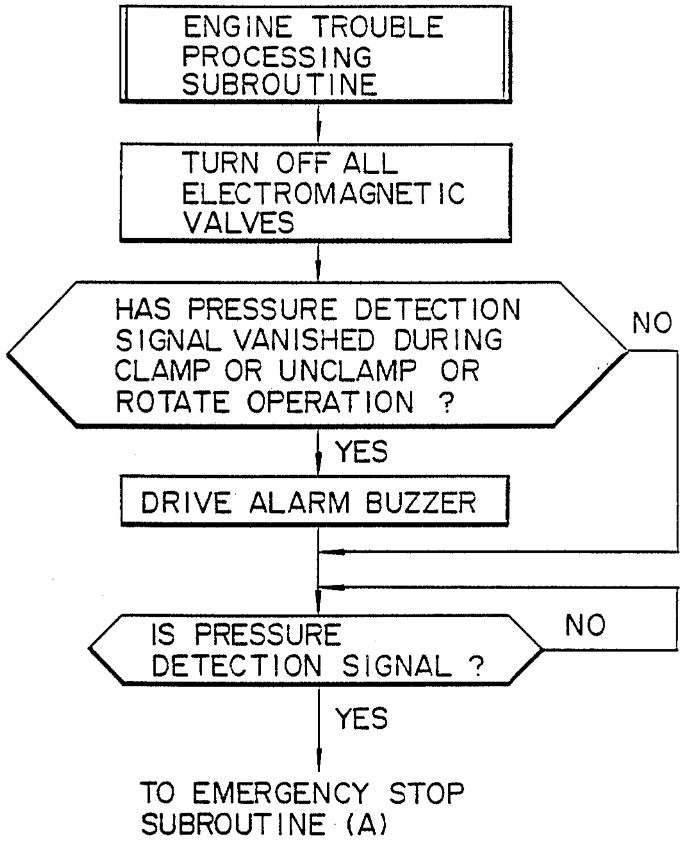
Figure 14:
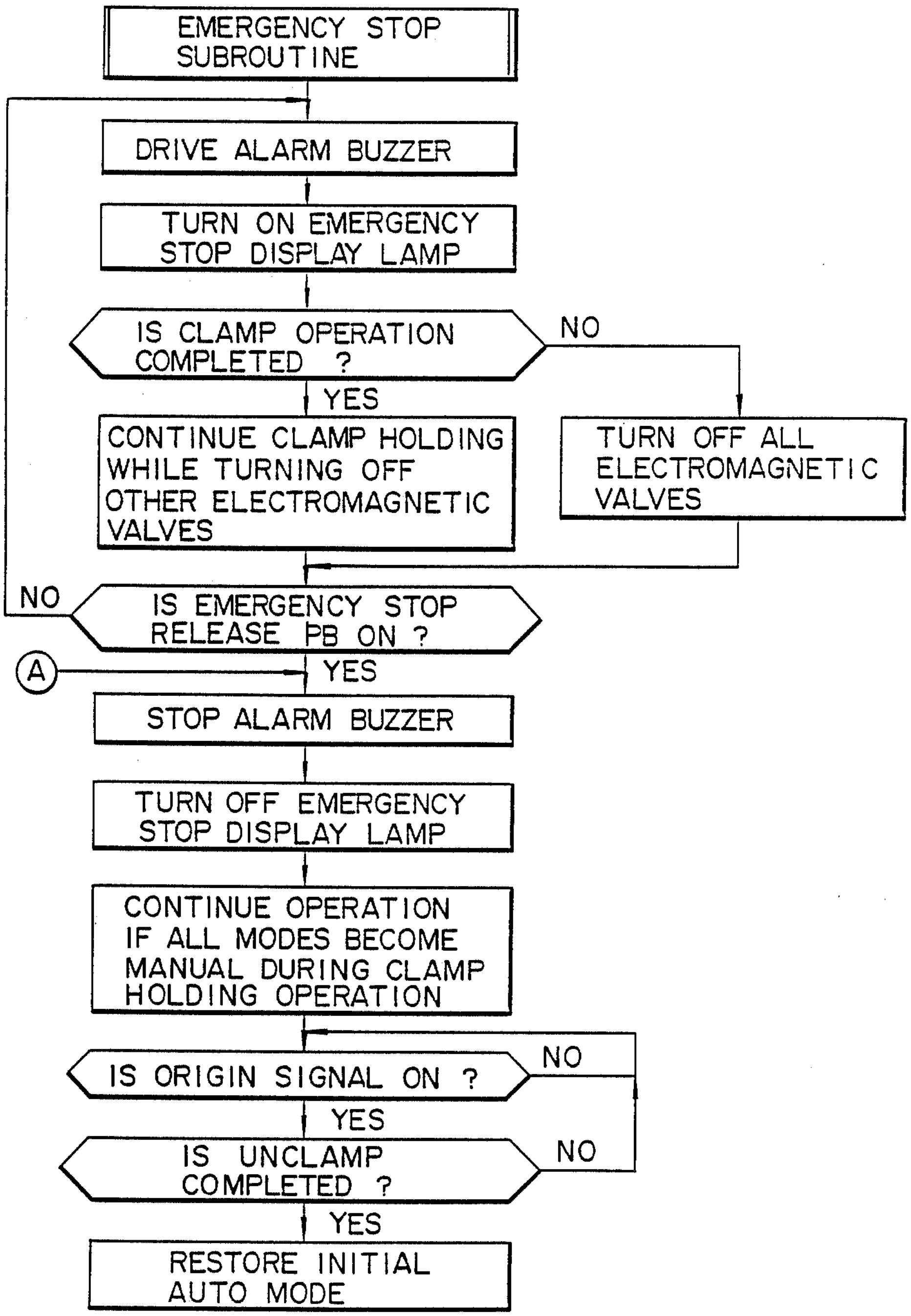
Figure 15:
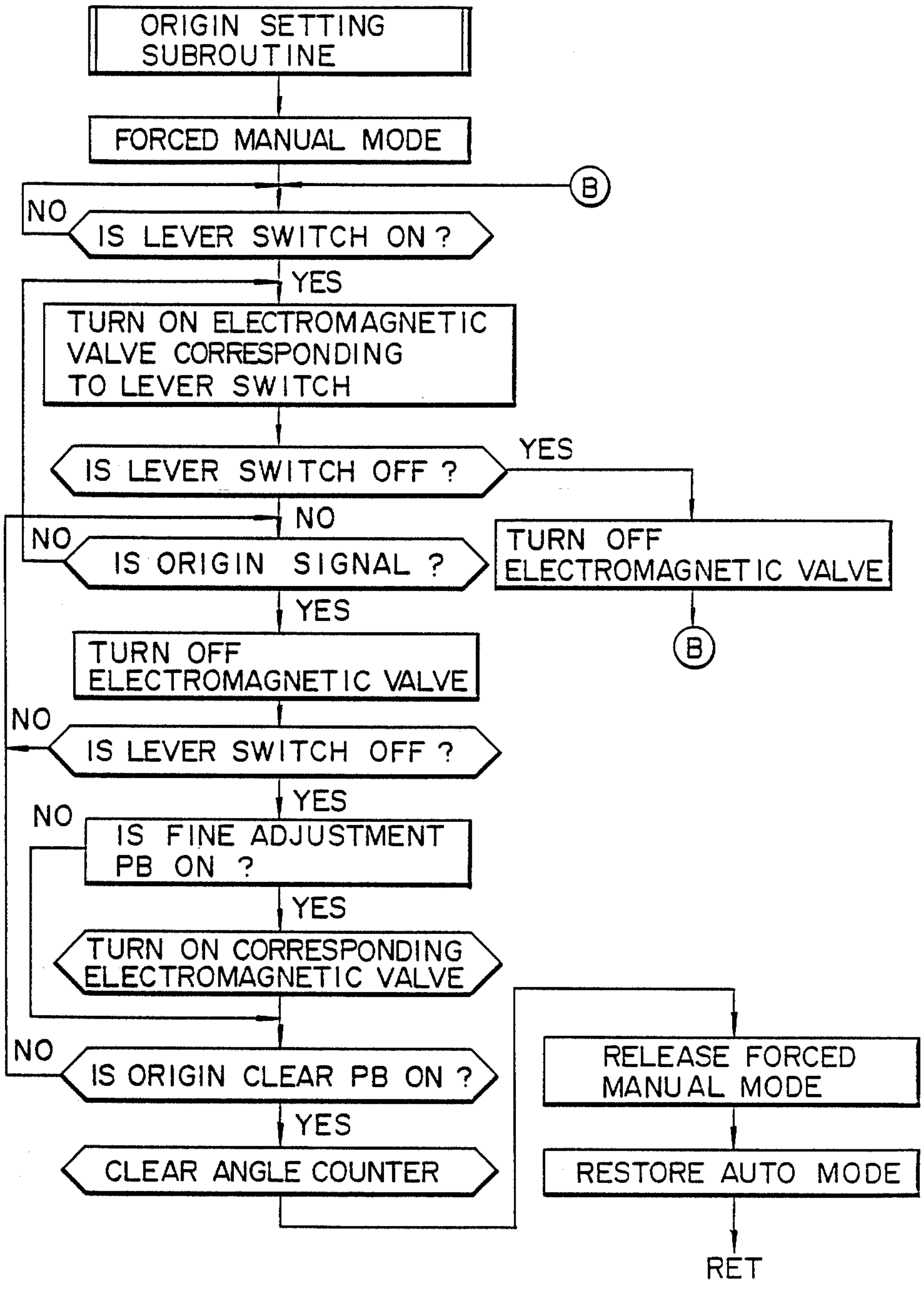
Figure 16:
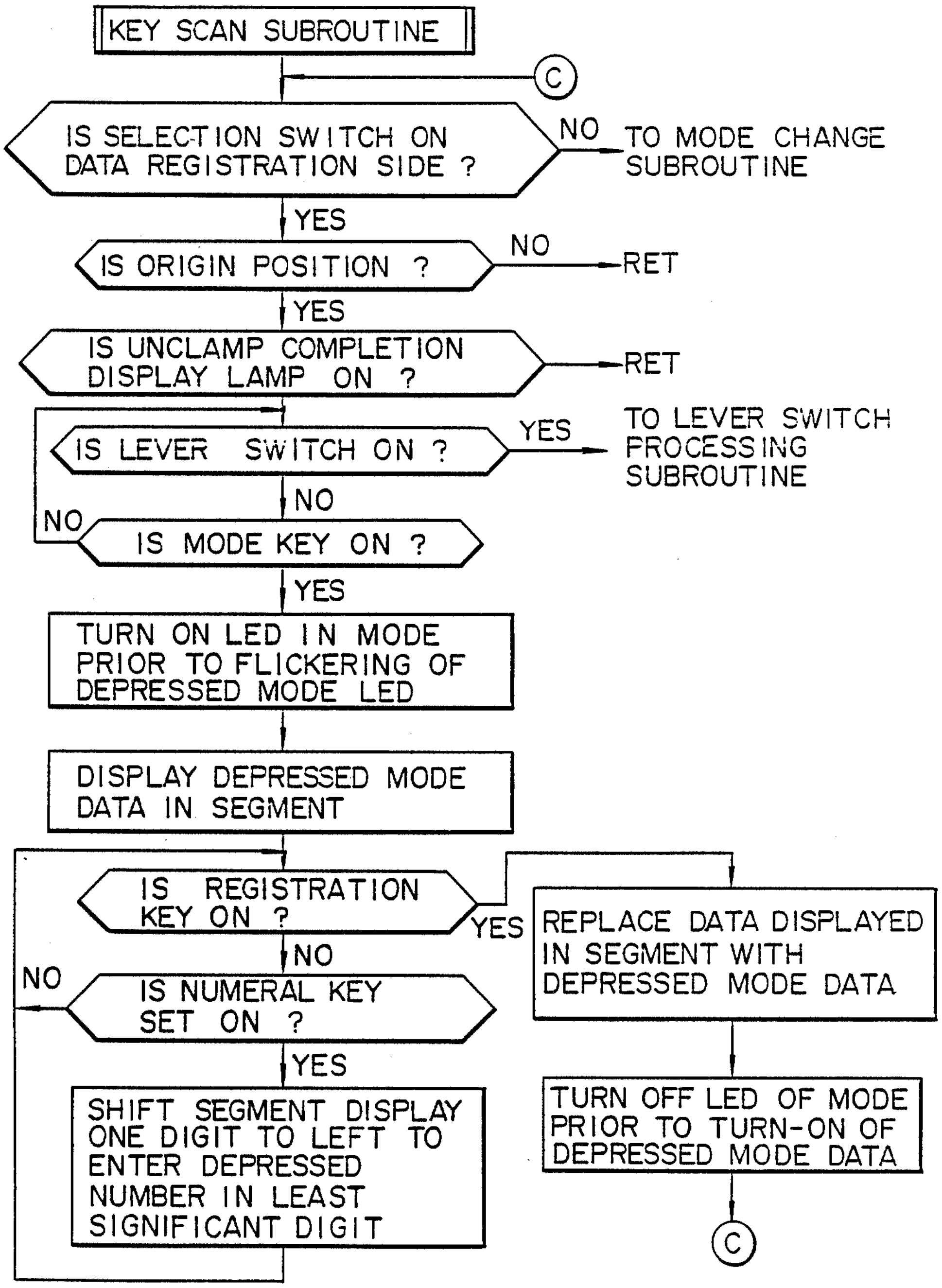
Figure 17:
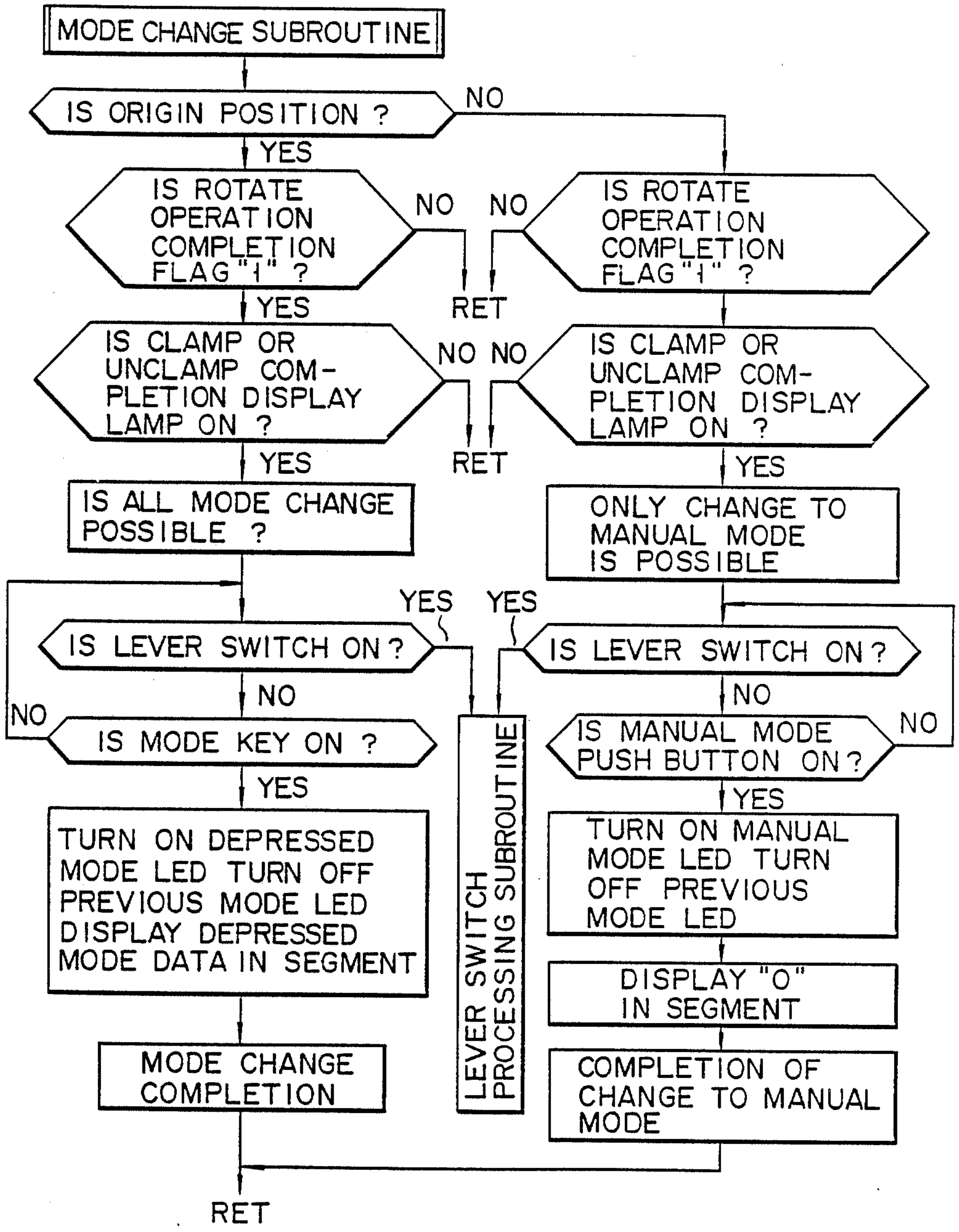
Figure 18:
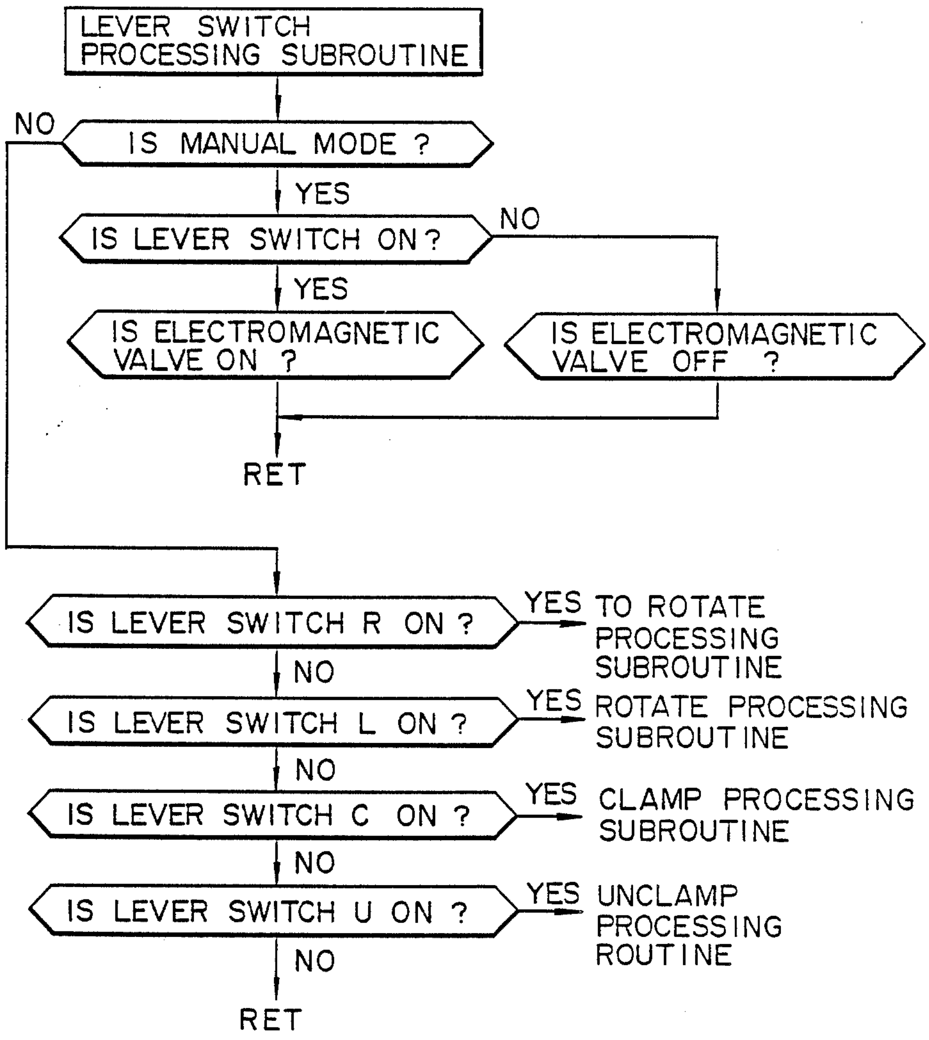
Figure 19:
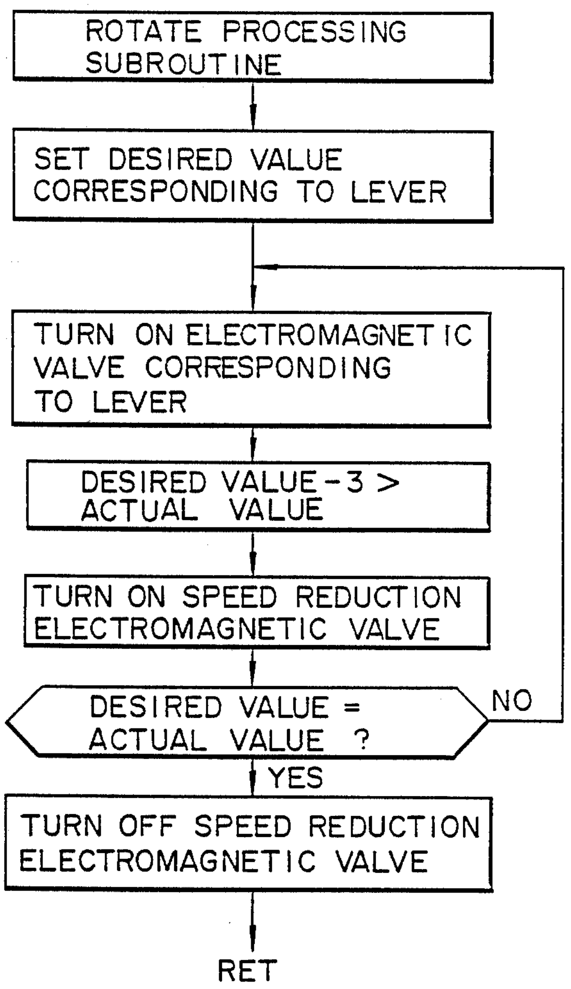
Figure 20:
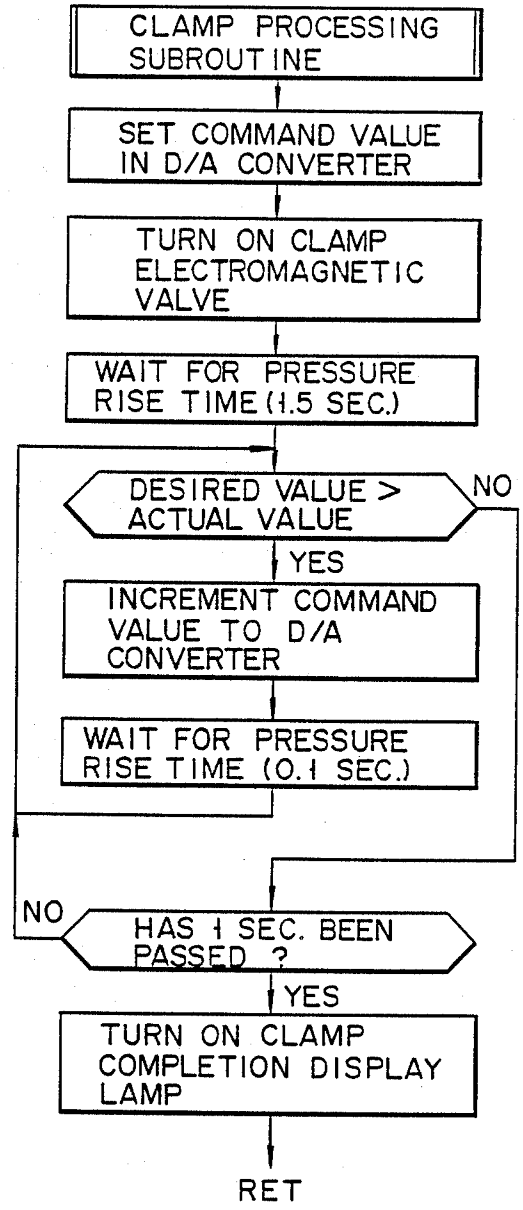
Figure 21:
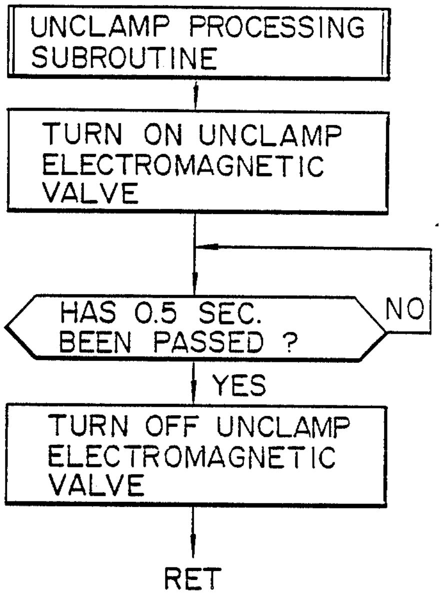

FIG. 11 shows a clamp/unclamp mode setting logic. The logic has switches CM and CA to CC corresponding to manual clamp command push button CM and auto clamp command push buttons a to c. Further, it has switches UM and UA corresponding to unclamp manual and auto command push buttons. Signals from switches CM and UM are taken out in a pressure and angle control completion state. These signals set respective flip-flops 220 and 224. Signals from flip-flops 220 and 224 are taken out in the presence of an origin signal and in a pressure and angle control completion state. These signals set flip-flops 221 to 223 and 225. More specifically, flip-flops 220 to 224 are set when switches CM, CA to CC, UM and UA are operated under predetermined conditions where the operation is possible.

Flip-flops 220 to 223 which correspond to switches CM and CA to CC are set in a clamp operation state. Their set state is detected by AND gates 226 to 229. Output signals from AND gates 227 to 229 corresponding to an auto setting state are used as address designation signals for designating memory addresses a to c in memory 200. When an output signal from one of AND gates 226 to 229 is provided in the presence of an output signal form OR gate 230 detecting the set state of one of flip-flops 220 to 223, this is detected by AND gate 231, which thus provides an output signal to reset flip-flops 220 to 223. When an output is provided from one of AND gates 227 to 229, flip-flop 232 is set. When an output is provided form AND gate 226, flip-flop 232 is reset, so that clamp manual signal CMN and clamp auto signal CAT are provided from flip-flop 232.

The above embodiment of the fork lift apparatus is driven by the logic as described with reference to FIGS. 5 to 11. More specifically, rotator angle data and clamp pressure data in auto state are written in memory areas a to c by the operation of rotate, clamp and unclamp command push buttons set in an initial state in correspondence to the manual and auto and numeral key set 22.

Fork lift control in auto mode is thus done with a plurality of data set in correspondence to the rotator, clamp, etc. When operating the fork lift apparatus, the rotator angle and clamp pressure are set in correspondence to the contents of operation with the push buttons. While the rotate, clamp and so forth commands are generated with operation of operation lever 21, when a command is generated, data corresponding to the contents of the command is provided as desired value. When the desired value is provided, the operation of the rotator or clamp is executed through comparison of the actual and desired values. In this way, predetermined heavy object clamping and other operations are performed.

Thus, cylindrical objects such as paper rolls are handled safely and reliably without need of any particular skill.

FIGS. 12 to 21 show flow charts illustrating the execution of operations as described above using a microcomputer.

What is claimed is:

1. A lift truck control system comprising:

a clamp for clamping an object to be transported at a controllable pressure;

a rotator for rotating said clamp by a controllable amount;

clamp pressure sensor means, coupled to said clamp, for detecting a clamp pressure data, indicative of a pressure with which said object to be transported is clamped by said clamp;

angle sensor means for detecting a rotator angle data indicative of a rotational angle of said rotator from a reference angle position;

pressure memory means for storing a plurality of clamp pressure data to be set for said clamp, in a plurality of memory areas;

angle memory means for storing a plurality of rotator angle data to be set for said rotator, in a plurality of memory areas;

selector means for selecting one of said plurality of memory areas of said pressure memory means and one of said plurality of memory areas of said angle memory means;

readout means for, in a selection mode, reading out clamp pressure data and rotator angle data from said selected memory areas of said pressure memory means and said angle memory means respectively;

command generating means for generating a clamp command to said clamp, and generating turn commands which include right turn and left turn commands; and control means, responsive to said clamp command from said command generating means and coupled to said readout means, for comparing said clamp pressure data, read out by said readout means, with said detected clamp pressure data detected by said clamp pressure sensor means and adjusting a pressure of said clamp to have a clamp pressure equal to said readout clamp pressure, and responsive to said turn commands from said command generating means, for comparing said rotator angle data read out by said readout means with said detected rotator angle data detected by said angle sensor means and adjusting an angle of said rotator by commanding said rotator to rotate to an angular position equal to the readout rotator angle.

2. A system as in claim 1 further comprising:

input means for loading said selected memory areas of said pressure memory means and of said angle memory means with clamp pressure data and rotator angle data, respectively, in a data input mode.

3. A system as in claim 2 wherein said command generating means is an operation lever which is being manipulated in a plurality of directions, a direction of manipulation of said operation level corresponding to a desired command.

4. An apparatus according to claim 2, which further comprises:

an operation panel including a plurality of selectable switch means for rotator control and clamp control, said selectable switch means including means for setting a manual mode and an auto mode for control of said rotator and said clamp, and wherein said selectable switch means includes a plurality of selector switches for selecting one of said plurality of memory areas in said angle memory means and one of said plurality of memory areas in said pressure memory means.

5. An apparatus according to claim 4, wherein each of said plurality of selector switches consists of a push button switch including means for displaying a commanded state thereof, said push button switches including a manual mode command push button switch for setting said manual mode and a plurality of auto mode operation condition command push button switches for setting said auto mode for each of the rotator and clamp controls.

6. An apparatus according to claim 4, which further comprises:

numeral key set means, provided on said operation panel, for coupling numerical data, said numeral key set means including mode selection means for selecting said data input mode and said selection mode, control data for rotator and clamp controls being selected by said plurality of selector switches in said selection mode.

7. An apparatus according to claim 6, wherein said numeral key set means has a plurality of numeral keys for numerals of 0 to 9.

8. An apparatus according to claim 6, wherein said mode selection means includes a cover for closing and opening said numeral key set means, said selection mode being selected when said cover is closed, said data input mode being selected when said cover is opened.

9. An apparatus according to claim 6, wherein data coupled from said numeral key set means being stored in a memory area of said pressure or angle memory means designated by said mode selection means in said data input mode.

* * * * *